United States Patent [19]

Wynstra et al.

[11] 4,182,696

[45] Jan. 8, 1980

[54] PROCESS FOR PRODUCING PARTICULATE FILLER-CONTAINING RESOLE MOLDING COMPOSITIONS FROM AQUEOUS DISPERSION

[75] Inventors: John Wynstra, Somerville; Sidney J. Schultz, Cranford, both of N.J.

[73] Assignee: Union Carbide Corporation, New York, N.Y.

[21] Appl. No.: 860,287

[22] Filed: Dec. 14, 1977

[51] Int. Cl.$^2$ .................................................. C08L 1/02
[52] U.S. Cl. ..................................... 260/17.2; 260/38; 260/39 R
[58] Field of Search ................................ 260/17.2, 374

[56] References Cited

U.S. PATENT DOCUMENTS 1,343,575  6/1920  Nash .................................... 260/38

OTHER PUBLICATIONS

Chem. Abst. 83:194366f; Takiyama et al., Granular Phenolic Resins.

*Primary Examiner*—Edward M. Woodberry
*Attorney, Agent, or Firm*—Franklyn Schoenberg

[57] ABSTRACT

Particulate, solid, heat-reactive, filler-containing resole molding compositions are directly produced by reacting a phenol, formaldehyde, and an amine in an aqueous medium containing a water-insoluble filler material having reactive sites on the surface thereof which chemically bond with a phenolic resin and protective colloid to produce an aqueous suspension of a particulate filler-containing resole, and recovering the filler-containing resole from said suspension.

36 Claims, No Drawings

PROCESS FOR PRODUCING PARTICULATE FILLER-CONTAINING RESOLE MOLDING COMPOSITIONS FROM AQUEOUS DISPERSION

The invention relates to a process for producing thermosetting molding compositions and more particularly to the preparation of particulate water insoluble resole (one-step) molding compositions.

Although solid, fusible, heat-reactive phenolic resole (one-step) resins which can be compounded into a molding material or compound have been produced by essentially the same process for more than a half century, the manufacture of these resins suffers from difficulties in product control and batch-to-batch reproducibility.

To make a resole, phenol is reacted with a molar excess of formalin, using a base catalyst. Under alkaline conditions, phenol and formaldehyde condense to form methylols:

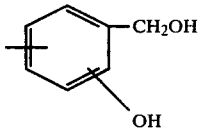

Further condensation results in the formation of methylene ethers and methylenes:

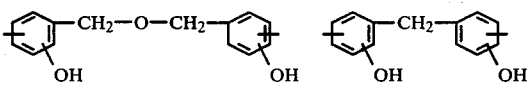

Because of the polyfunctionality of the system and because of the high formaldehyde to phenol mole ratio (typically 1.3 to 1.8), condensation to these latter structures cannot proceed very far before gelation will occur.

In the historical resole process, phenol, formalin (aqueous formaldehyde solution) and the base catalyst are held at 70° to 100° C. for a predetermined time to convert substantially all of the formaldehyde to methylol. Then the batch is dehydrated at a low temperature in a reduced pressure distillation step so that the 100% solids resin may be advanced at an elevated temperature to the desired degree of condensation. A hot plate gel time test (at 150° C.) is run on samples taken at regular intervals, and the time of arrival at a preselected endpoint is estimated. At this time the molten resin is discharged as rapidly as possible into water-jacketed resin coolers. It has been observed that the gel times of samples taken at the start of the discharge, at the midpoint, and at the end of the discharge differ considerably, since the hot resin in the still continues to advance before it can be completely discharged. The final resole resin is an amorphous brittle solid having a glass transition temperature not much above room temperature.

On the other hand, two-step phenolic resins (novolaks) are incapable of gelation and, therefore, are much less critical to make. It is readily understandable that, wherever possible, two-step resins, plus hexa (i.e., hexamethylenetetramine) to provide cure, are preferentially employed commercially. There are certain applications, however, for which the characteristics of the one-step resins may be preferred. One such application area is that of the pulverized resins where a two-step resin/hexa system is undesirable because of the volatility of hexa. Further incentive for providing an improved process for preparing particulate resole resin process can be found in the lower cost of formaldehyde than that of phenol, so that resoles currently have a raw material cost advantage over novolaks.

As is typical in preparing thermosetting resin molding compositions, the thermosetting resins are compounded with reinforcing and other filler materials to enhance the physical strength and other properties of articles fabricated from such resins. The filler materials may be in the form of fibrous or non-fibrous particles, and may be inorganic or organic. Phenolic resin molding materials are, in general, prepared in an operation in which a previously prepared resole or novolak resin, curing agents, fillers, mold release agents, pigments, etc., are blended and advanced to a B-stage on a hot two-roll mill, compounding extruder, Banbury mixer, and the like. After a specified compounding cycle, the compound is removed, cooled, and ground to a coarse powder. Providing a process for directly preparing resole molding compounds in particulate form eliminates both separate compounding and grinding operations, and would therefore be highly desirable for economic reasons as well as being more suitable for ecological reasons since the dust problem associated with grinding would be essentially eliminated.

The published literature has from time to time mentioned the production of powdered or particulate phenolic resins from dispersions, usually aqueous dispersions, by removal of the dispersing medium. For instance, there are casual references to the drying of aqueous suspensions or dispersions of phenolic resins to leave a dry, powdered residue. Dent et al., U.S. Pat. No. 2,069,178, is illustrative. Cheetham, in U.S. Pat. No. 1,976,433, discloses the joint precipitation of a phenolic resin and a filler to produce an intimate mixture of the resin and filler. A number of patents disclose the spray drying of aqueous phenolic resin mixtures to produce a dry, but usually water-soluble, phenolic resin. Illustrative are Dike, U.S. Pat. No. 2,186,369, Stephan, U.S. Pat. No. 2,675,336, and Spahr et al., U.S. Pat. No. 2,489,336. Wismer et al., in U.S. Pat. No. 3,850,868, disclose the production of inert phenolic resin beads by reacting phenol with from 1 to 3 moles of formaldehyde in an aqueous basic medium to form a prepolymer, blending the prepolymer with a protective colloid such as polyvinyl alcohol, fully polymerizing the prepolymer by acidifying and heating the mixture under agitation to form the inert beads, and removing the water. Kooguchi et al., in U.S. Pat. No. 3,743,619, describe the production of novolak powders by removing the water from an aqueous dispersion of a novolak. Spitzer, in Swiss Pat. No. 153,843 (Chem. Abs. 1933, 27, 1113), proposed to precipitate plastic masses from colloidal solutions by the addition of a urea-formaldehyde hydrosol. Bresser, in British Plastics and Moulded Products Trader, August 1932, 4, 105, 112, reported the preparation of phenolic resin precipitates by dilution, "salting out", or acidification of an aqueous phenolic resin suspension containing a dispersing agent or protective colloid. (In this respect, Bresser cited D.R.P. 516,677.)

In U.S. Pat. No. 1,807,545, Ostersetzer et al. disclose the production of powders by reacting a phenol and formaldehyde in an alkaline aqueous medium in the presence of a protective colloid such as gum arabic, followed by precipitating a powder from the reaction mixture. Example 2 of the patent, wherein the basic catalyst was a mixture of sodium hydroxide and ammonia, was followed as closely as possible. (This was made difficult by the lack of detail in the Example relating to endpoint and reaction cycle.) Using reaction conditions (15 minutes at 85° C.) so as to obtain a resin having a typical 150° C. hotplate gel time endpoint of 60 to 90 seconds, an emulsion of a liquid phenolic resin was made that passed through a filter. In a repeat experiment using a longer reflux time (1.5 hours at 100° C.), a filterable but gelled product was produced which nevertheless sintered on storage.

In copending application Ser. No. 776,881 of Wynstra et al filed Mar. 14, 1977, there is disclosed a process for directly preparing particulate solid, substantially water-insoluble resole resins comprising the steps of (a) reacting formaldehyde, a phenol, and hexamethylenetetramine or a compound containing amino hydrogen in an aqueous medium containing a protective colloid for a period of time and at a temperature to produce an aqueous dispersion of a particulate solid resole resin and (b) recovering the particulate resole from the aqueous dispersion. The disclosure, however, is concerned solely with the direct preparation of particulate phenolic resole resins and does not teach a process for directly preparing particulate phenolic resole molding compositions containing filler materials of any type.

Other prior art discloses the preparation of aqueous phenolic resin dispersions utilizing various interfacial agents. (This art does not teach the isolation of the dispersed reactive resin by removing the water.) Illustrations include Harding, U.S. Pat. No. 3,823,103, Ingram, U.S. Pat. No. 3,666,694, and Anderson et al., U.S. Pat. No. 3,862,060.

In accordance with the present invention there is provided a process for the production of particulate solid, heat-reactive, substantially water-insoluble resole molding compounds comprising the steps of:

(a) reacting formaldehyde, a phenol, and hexamethylenetetramine or a compound containing amino hydrogen, in an aqueous medium containing a substantially water-insoluble filler material having reactive sites on the surface thereof which chemically bond with a phenolic resin, and an effective amount of a protective colloid, for a period of time and at a temperature sufficient to produce an aqueous dispersion of a particulate solid, heat reactive, substantially water-insoluble filler-containing thermosetting resole molding composition which has been advanced to the desired stage; and (b) recovering said particulate filler-containing resole from said aqueous dispersion.

The filler material used in the aqueous medium is in an amount that will provide a molding composition containing to about 75 weight percent, and preferably about 40 to about 60 weight percent, based on the weight of the composition, of a reinforcing filler for the resin.

The following definitions apply in this invention:

Particulate solid—This term refers to a finely divided, substantially free flowing solid. By "solid", is meant a filler-containing resin wherein said resin portion thereof has a softening point (glass transition temperature) above about 30° C., and preferably about 40° C.

Molding composition—Intimate mixture of phenolic resin, fillers, curing agents, etc., in particulate, sheet and the like form which may be formed using heat and pressure into a thermoset resin state having a variety of shapes, sizes and configurations.

Heat-reactive—This refers to a phenolic resin that is capable of polymerization at a usefully practical rate when subjected to elevated temperatures, e.g., temperatures above about 100° C. Ordinarily, such resins will advance slowly, but measurably, even at lower temperatures.

Phenolic resin—a condensation product of a phenol and an aldehyde, usually formaldehyde.

Resole—a phenolic resin produced using at least equimolar amounts, and usually more, of aldehyde. Base catalysts are ordinarily used in making resoles. As used in the art, "resole" refers to phenolic resins that contain useful reactivity, as opposed to the fully polymerized or cured resins.

Substantially water-insoluble—This refers to a phenolic resin or resin composition that, while it may very well contain a finite proportion of water-soluble components (such as unreacted phenol or mononuclear methylol phenols), is capable of existing as a separate phase in an aqueous medium.

Protective colloid—A composition that is capable of promoting the production of, or of maintaining, a filler-containing phenolic resin composition in water dispersion wherein the phenolic resin is the dispersed phase and the aqueous medium is the dispersing or continuous phase.

Aqueous dispersion—As used herein, an aqueous dispersion is a dispersion wherein the dispersing or continuous phase is composed primarily of water, although some organic material will be dissolved in the aqueous phase and some water will be contained in the dispersed resin phase.

Amino hydrogen—Refers to a hydrogen atom bonded directly to an amino nitrogen (including ammonia). As used herein, the term excludes amido hydrogens wherein the nitrogen is alpha to a carbonyl group.

In the first step (step (a)) of the process of the invention, formaldehyde is reacted with a phenol and hexamethylenetetramine or a compound containing at least one amino hydrogen, in an aqueous medium containing a substantially water-insoluble filler material having reactive sites on the surface thereof which will chemically bond with a phenolic resin and a protective colloid. The formaldehyde is most conveniently and economically employed in the form of the aqueous solution known as "formalin", although other forms, such as paraform, can be used.

The process also uses a trifunctional phenol, such as phenol (monohydroxybenzene), m-cresol or resorcinol, or a tetrafunctional phenol, such as 2,2-bis(4-hydroxyphenyl)-propane ("bisphenol-A"), and mixtures thereof. Di-functional phenols such as p-cresol, o-cresol, p-chlorophenol, and p-t-butylphenol, can also be used, but only as a fraction of the phenol part of the formulation. Routine experimentation will suffice to determine the maximum proportions of difunctional phenol that can be used in particular cases, while still producing a thermosetting product.

A third reactant is hexa or a compound that contains at least one amino hydrogen. Specific preferred illustrative examples include ammonia and hexa (the two are complete equivalents in this invention). Aliphatic amines such as methylamine, dimethylamine, ethylene diamine, and monoethanolamine may also be employed but when used, they will usually be employed in minor amounts in combination with ammonia and/or hexa as a means for increasing flow.

The reactants are employed in proportions such that the resulting resole is a thermosetting composition. The maximum utilizable proportion of methylene is 0.5 methylene per ring hydrogen in the phenol that is reactive with formaldehyde. (One equivalent of methylene is provided by each mole of formaldehyde. The reactive ring hydrogens are those that are ortho and para to the phenolic hydroxyl.) The operative proportions of the reactants are much broader, however, and actually cannot be stated with much precision. For instance, a large excess of methylene can be present in the reaction mixture, but the excess will either be extracted (as free formaldehyde) during subsequent washing of the resole, or it will be lost during cure causing undesirable gassing problems during molding of the resole molding compositions. Resoles containing excess formaldehyde will also have an increased tendency to sinter. If insufficient methylenes are present in the reaction mixture, a thermosetting product can still be produced, but part of the phenol will remain unreacted. Much of the free phenol can be extracted from the product by washing, but it would have to be recycled to avoid waste. In almost all cases, the reaction mixture will contain from about 0.25 to about 1 methylenes per reactive hydrogen in the phenol. As a guide, when phenol (monohydroxybenzene) is used, preferred proportions will be from about 1.25 to about 1.75 equivalents of methylene per mole of phenol.

As a general rule, the amine compound is used in an amount sufficient to maximize the yield of resole resin from the organic reactants and to insure good flow characteristics of the resole molding composition during molding operations. A certain minimum proportion appears to be required in order to obtain the maximum yield of particulate solid resole resin composition, and more important, to impart desired mold flow characteristics. This minimum proportion will vary somewhat, depending on such factors as the nature of reactants and proportion of methylene to phenol, the time and temperature conditions under which the reaction is carried out and the type of filler to be used. For example when phenol (monohydroxybenzene) is used, a minimum of about 3 parts, and preferably about 6 parts, of hexa per 100 parts of phenol should be used. A convenient way to determine the approximate minimum proportion needed in particular cases, is to vary the proportion of amine compound in several batches to determine at what point the resinfiller composition exhibits the desired molding characteristics. Conventional "spiral-flow" or "cup-closing tests" may be used for evaluation of the mold flow characteristics of the composition. Somewhat greater amounts of amine compound than the preferred amount may be employed, but no advantage in doing so is evident.

In accordance with the practice of the invention, the reaction of phenol, formaldehyde, and an amine compound is carried out in an aqueous medium containing fillers having reactive sites on the surface thereof which chemically bond with phenolic resin. Filler materials typically used in compounding phenolic thermosetting resins to enhance the physical strength properties of parts fabricated therefrom may be in the form of non-fibrous or fibrous particles, may be inorganic or organic, and they may range from materials such as cotton, asbestos and wood fibers to wood flour. Such filler materials which are suitable for use are materials which possess reactive sites on the surface thereof which chemically bond with phenolic resin. Exemplary of suitable fillers are asbestos, wood flour, various cellulose fibers, talc, and mixtures of the same.

Such fillers may be employed in the aqueous medium in amounts that will provide resole-filler molding compositions with from about 5 weight percent to about 75 weight percent, and preferably from 40 to 60 percent, of filler based on the weight of molding compound, the particular amount and type of filler to be used being dependent upon the applications for which the molding composition will be employed. A typical general purpose molding composition will, for example, contain about 50 weight percent of wood flour, based on the weight of the molding composition. It has been found, however, that there are maximum amounts of fillers that may be used in accordance with the practice of the invention. Too great an amount of filler may adversely increase the viscosity and thixotropic character of the reaction dispersion, reducing the effectiveness of agitation thereof, and as a general rule this factor should therefore be considered in determining the filler materials to be employed in making molding compositions for particular applications. It has also been found that filler materials that do not possess reactive sites, and would therefore not be suitable for use, may, however, be employed as a replacement for a small proportion, e.g. 5 to 10 weight percent, of the suitable filler material to prepare molding compositions required for certain applications. For example, 5 to 10 weight percent of glass fiber may be used with 90 to 95 weight percent of wood flour.

Certain other non-reinforcing fillers and additives such as pigments, flow-control agents, antioxidants, processing and molding aids and the like typically employed in preparing thermosetting resin molding compositions may also be employed in the practice of the invention to impart special properties to the particulate, filler-containing resole molding compositions or products prepared therefrom. Such kinds of fillers may be used in the aqueous medium in amounts generally required to impart the particular special properties, provided, however, that use of such materials does not in any way affect formation of the particulate, filler-containing resole resin or stability of the dispersion.

The process of the invention also uses a protective colloid. Materials that have been found to be operative as protective colloids include gum arabic, gum ghatti, hydroxyalkyl guar gum (e.g., the ethylene oxide or propylene oxide adducts of guar gum having a minimum degree of hydroxyalkylation of about 5 weight percent), partially hydrolyzed polyvinyl alcohol, hydroxyethyl cellulose, carboxymethyl cellulose, soluble starch, and agar. Gum arabic, gum ghatti, hydroxypropyl guar gum, and partially hydrolyzed polyvinyl alcohol have given the best results. Commercially available polyvinyl alcohols that are suitable are those having a molecular weight of the order of about 10,000 to about 125,000 and a degree of hydrolysis of about 88 percent (remainder of the units in the polymeric chain being vinyl acetate units). Lower molecular weight versions (about 3000 m.w.) of 88 percent hydrolyzed polyvinyl alcohol, and a 99 percent hydrolyzed 10,000 molecular weight, version of polyvinyl alcohol, however, may be suitable for certain applications.

The protective colloid is used in an effective amount, that is, in an amount sufficient to promote the formation and stabilization of a phenolic resin-filler dispersion in water while the reaction mixture is being agitated during preparation of the phenolic resins. It is desirable for the dispersion to settle on standing within a reasonable time (e.g., within a few minutes), in order to facilitate separation of the particulate resin phase from the aqueous phase. Of course, when the resin phase settles, it should not coalesce to a non-particulate mass. This capability is a function of both the substantial water-insolubility of the resin and the protective colloid.

It is desirable to use the protective colloid in a minimum effective amount, but the proportions needed may vary somewhat from one case to another, and can be determined by routine experimentation. A minimum effective amount will normally be from about 0.5 to about 1.0 weight percent, based on weight of phenol, but the protective colloid may be used in amounts of more than about 2 weight percent, based on weight of phenol. It has also been found that the particle size of the particulate resin-filler product may be varied by employing different amounts of protective colloid.

In accordance with the process of the invention, the reaction is carried out in an aqueous medium. The minimum amount of water that should be used is that proportion which will permit the formation of a filler-containing phenolic resin-in-water dispersion. While the minimum amount of water needed will vary from one formulation to another, as a rule at least about 30 percent by weight of water, based on the weight of the total reactants charge should be used. Such factors as the type and amount of filler material, the viscosity of the aqueous reaction mixture and its effect on the ability to provide adequate agitation therefor are important in determining the amount of water to be used. A moderate excess over the minimum amount of water is recommended. There is no advantage to using a large excess (in fact, it is undesirable because reactor productivity will be reduced), although the process will be operable with a large excess of water.

The reaction step (step (a)) can be carried out by charging all the components to a conventional reaction vessel (such as the type that has been used for 50+ years in making phenolic resins) while agitating the mixture to obtain generally good dispersion thereof, and heating the reaction mixture, while agitating, to an elevated temperature. The order of addition of the various components is not critical, though it is probably preferable to add the filler material last, over a period of a few minutes, to allow for its incorporation and dispersal in the reaction mixture. It has been found that the addition of certain fillers to the reaction mixture is accompanied by a pronounced viscosity increase along with some thixotropy, resulting in some difficulty in effectively agitating the mixture. Heating the mixture to the reaction temperature of the reactants, however, may in many instances markedly decrease the viscosity of the mixture within a short time, so that agitation thereof becomes more effective. A reaction temperature of about 80°–85° C. has been found to be convenient, although a temperature of from about 70° to about 100° C. could be used in some cases. At lower temperatures, below, for example, about 55° C., the reaction becomes impracticably slow. The reaction is continued until the desired degree of reaction is achieved, and preferably, until the phenolic resin has attained the B-stage state. In general, the time of reaction may vary, but the B-stage state for the resin will usually be reached in about 1.5 to 5 hours at 80°–85° C. The temperature can be maintained during the reaction by standard heating or cooling means, as required. In commercial size batches, vacuum reflux is a convenient way to maintain the desired temperature.

When the desired reaction time has been reached, the mixture is cooled to below about 40° C. to quench the reaction.

In the second step (step (b)) of the process, the particulate filler-containing solid resole is recovered from the aqueous dispersion product of step (a). The dispersion can be diluted with more water, cooled to 20° to 30° C., and filtered to product a wet filter cake. (In commercial scale operation, centifugation may be preferable to filtration.) The filter cake can then be washed with pure water (at 20° C. to 30° C.,) filtered again, and then dried. During the final drying step, gentle agitation is desirable in order to deter agglomeration of the particles. Fluidized bed drying has been found to be an excellent way to effect the final drying step. In an alternate embodiment, the drying step may be used to advance the resin to the B-stage if it had not been advanced during the reaction step of the process.

The resulting particulate filler-containing resole-molding composition, which has been directly prepared in powder form, is often a free-flowing powder that has excellent resistance to sintering. The powder, as directly prepared by the process of the invention, can be used for the classical phenolic molding resin applications, such as compression or injection molding, and the like. While, as is well known, there is no critical particle size for molding compositions, it is generally required to use grinding or pulverizing means to obtain a particle size that can be used commercially. Particulate filler-containing resole molding compositions prepared in accordance with the practice of the present invention, however, can be used in molding applications without any further mechanical working, and in general, have been found to have a particle size up to about 1000 microns, and particle sizes of between 10 and 1000 microns have been prepared. (The particle size will depend on the dimensions of the filler and on the degree of liberation of filler bundles.)

The invention will become more clear when considered together with the following examples which are set forth as being merely illustrative of the invention and which are not intended, in any manner, to be limitative thereof. Unless otherwise indicated, all parts and percentages are by weight.

EXAMPLE 1

A "standard formulation" is employed for many of the experiments reported here (the formulation is selected for convenience, and is not necessarily an optimized formulation for any particular end-use application). The components of the reaction mixture of this Example have the following proportion of ingredients:

| Component | Parts | Moles Per Mole Phenol |
|---|---|---|
| Phenol | 100.0 gms | 1 |
| 50% Aqueous Formaldehyde | 72.0 gms | 1.13 |
| Water | 398.0 gms | |
| Hexa | 9.0 gms | 0.06 |
| Protective Colloid | 2.0 gms | |
| Carbon Black | 2.0 gms | |
| Wood Flour | 120.0 gms | |

The formulation contains 1.49 equivalents of methylene per mole of phenol and 0.24 equivalents of amino nitrogen per mole of phenol.

The protective colloid employed is a partially hydrolyzed (88% hydrolyzed) polyvinyl alcohol having a low (about 10,000) molecular weight available under the tradename VINOL 205 from Airco Chemical & Plastics. Molacco Black is the carbon black pigment employed.

The following experimental procedure is used:

The phenol, aqueous formaldehyde (formalin) and water are weighed directly into a 1-liter flask which is equipped with a motor-driven paddle stirrer, a thermometer, and a reflux condenser. After adding the hexa (hexamethylenetetramine) and protective colloid (both as dry powders), carbon black and wood flour are added while agitating the mixture, and the batch is heated cautiously to 85° C. The temperature of the batch is held at 85° C. for about 2.5 hours while agitating the mixture. At the end of this time, a portion of a 700 gram water wash is added to batch which is cooled to 30° C. The cooled batch is then poured into the remainder of the wash water at room temperature in a 2-liter beaker and stirred with a magnetic bar. After 10 minutes, the dispersion is filtered on a large diameter Buchner funnel, at first with a low vacuum and finally with full house vacuum. The filter cake is broken up and dried in a laboratory sized, fluidized bed drier maintained at 60° C. for 30 minutes.

The black, wood flour containing material is a very low density, free-flowing powder which appears uniform in coloration. The powder is compression molded into a disc about 2 inches in diameter and about ⅛ inch thick by curing 5 minutes at 385° F. (196° C.). Because of the very fluffy, low density nature of the powder, it is necessary to first cold-press it in a mold into a preform prior to curing. Uniformly colored, cured plaques are prepared.

EXAMPLE 2

A reaction mixture having the following proportion of ingredients is prepared:

| Component | Parts | Moles Per Mole Phenol |
|---|---|---|
| Phenol | 100.0 gms | 1.0 |
| 40% Aqueous Formaldehyde | 90.0 gms | 1.13 |
| Hexa | 9.0 gms | 0.06 |
| Stearic Acid | 1.5 gms | |
| Protective Colloid | 2.0 gms | |
| Water | 280.0 gms | |
| Asbestos Floats | 120.0 gms | |

The protective colloid used is VINOL 205, the same material described in Example 1. The filler material, asbestos floats, is a very short asbestos fiber material widely used in phenolic molding compositions. Stearic acid is added to serve as a mold release agent.

The following procedure is employed:

All the components are weighed directly into a 1-liter Morton flask which is equipped with a motor-driven stirrer, a reflux condenser, and a thermometer. The order of addition of the various materials is not critical, but as here, it is preferred to add the filler last and over a period of a few minutes to allow for its dispersal. Addition of the asbestos filler is accompanied by a pronounced increase in viscosity along with some thixotropy making effective agitation more difficult. The batch is cautiously heated to 85° C. and held at this temperature for 2½ hours while agitating the mixture. Within a short time at 85° C., the viscosity of the batch markedly decreases so that agitation thereof becomes more effective. At the end of the 2½ hours, a portion of a 700 gram water wash is added to the batch cooling it to about 30° C. The cooled batch is then poured into the remainder of the wash water at room temperature in a 2-liter beaker and stirred. After about 10 minutes, the dispersion is filtered and then the filter cake is broken up and dried in a laboratory sized, fluidized bed dryer at 60° C. for 30 minutes.

The dried product is a free flowing product which is cured into plaques using the procedure described in Example 1.

EXAMPLE 3

In this experiment, the standard formula and procedure of Example 2 is employed.

A number of materials are substituted for the VINOL 205 protective colloid of the standard formula, each at the 2 parts level. It is easy to differentiate the protective colloids from the materials that do not exhibit protective colloid properties, the latter resulting in a badly coagulated product, while suitable protective colloids, on the other hand, gave an adequate dispersion, good filter-ability, and particulate, generally free-flowing products.

The following materials are found to be completely operative: gum arabic, gum ghatti, hydroxyethyl cellulose, carboxymethyl cellulose, high molecular weight partially hydrolyzed polyvinyl alcohol (VINOL 540 (Airco Chemical and Plastics); 88% partially hydrolyzed, about 96,000 molecular weight), and soluble starch. In Table I is listed the materials which are found to be inoperative.

TABLE I

MATERIALS SHOWING NO ACTIVITY AS PROTECTIVE COLLOIDS IN STANDARD PARTICULATE RESOLE FORMULA

| Material | |
|---|---|
| Polyox N-10 | Poly(ethylene oxide), 100,000 MW |
| Casein | Protein |
| Acrysol | Polyacrylic acid, Na salt |
| Tergitol NP-40 | Nonionic surfactant |
| None of these materials yields a filterable product. | |

EXAMPLE 4

The proportion of ingredients listed below is used to produce an example of a filler-containing bisphenol-A one-step composition in particulate form.

| | |
|---|---|
| 100.0 grams | Bisphenol-A |
| 80.0 grams | 40% Formalin |
| 8.0 grams | Hexa |
| 7.0 grams | Stearic Acid |
| 280.0 grams | Water |
| 2.0 grams | VINOL 205 |
| 130.0 grams | Asbestos Floats |

The procedure used in analogous to that described in earlier Examples. As in the case of phenol, reaction was at 85° C. for 2½ hours. The recovery of the solid particulate product proceeds exceptionally well and is compression molded successfully.

EXAMPLE 5

Reaction mixture having the following proportion of ingredients are prepared:

| COMPONENT | PARTS (gms) | | |
|---|---|---|---|
| | A | B | C |
| Phenol | 100.0 | 100.0 | 100.0 |
| 40% Aqueous Formaldehyde | 90.0 | 90.0 | 90.0 |
| Hexamethylenetetramine | 9.0 | 6.0 | 3.0 |
| Stearic Acid | 1.5 | 1.5 | 1.5 |
| Vinol 205 (Protective Colloid) | 2.0 | 2.0 | 2.0 |
| Water | 280.0 | 280.0 | 280.0 |
| Asbestos Floats | 120.0 | 120.0 | 120.0 |

The procedure used to prepare each of the samples is the same as that in Example 2. A solid, particulate substantially free flowing product is readily recoverable from each of the reaction mixtures. The particulate filler containing-resole obtained from each of the reaction mixtures contains resin to filler in a ratio of about 50:50.

Samples of product from each of the resin mixtures are compression molded and cured using the procedure described in Example 1.

Cured plaques of the molding composition from resin mixture C are uniform in color and appearance but exhibit the formation of a great deal of flash. Cured plaques of the molding composition from resin mixture A and B are uniform in appearance and exhibit good mold flow characteristics during molding.

EXAMPLE 6

| COMPONENT | PARTS (gms) | | | |
|---|---|---|---|---|
| | A | B | C | D |
| Phenol | 100.0 | 100.0 | 100.0 | 100.0 |
| 40% Aqueous Formaldehyde | 90.0 | 90.0 | 90.0 | 90.0 |
| Hexa | 9.0 | 9.0 | 9.0 | 9.0 |
| Stearic Acid | 1.5 | 1.5 | 1.5 | — |
| Zinc Stearate | — | — | — | 5.0 |
| Vinol 205 (Protective Colloid) | 2.0 | 1.0 | 0.5 | 2.0 |
| Water | 280.0 | 280.0 | 280.0 | 280.0 |
| Asbestos Floats | 120.0 | 120.0 | 120.0 | 120.0 |

The procedure described in Example 2 is used to carry out each of the reactions of this Example.

Reaction mixture D, which contains zinc stearate as a mold release agent, does not prepare a stable dispersion, the precipitate formed thereby rapidly separating from the mixture and forming an agglomerate.

Reaction mixture C only forms a partial particulate dispersion of the reaction product, with the rest of the reaction product being coagulated.

Reaction Mixtures A and B form readily separable solid particulate products, the dried product from Reaction Mixture B being more dense and having generally large particles, while the particulate product from Reaction Mixture A having a small particle size and low apparent density. Particulate products from Reaction Mixtures A, B, and C are cured using the procedure described in Example 1 to form uniform plaques.

EXAMPLE 7

Reaction mixtures having the following proportion of ingredients are prepared:

| COMPONENT | PARTS (grams) | | | | |
|---|---|---|---|---|---|
| | A | B | C | D | E |
| Phenol | 100.0 | 100.0 | 100.0 | 100.0 | 100.0 |
| 50% Formaldehyde | 72.0 | 72.0 | 72.0 | 72.0 | 72.0 |
| Hexa | 9.0 | 9.0 | 9.0 | 9.0 | 9.0 |
| Vinol 205 (Protective Colloid) | 2.0 | 2.0 | 2.0 | 2.0 | 2.0 |
| Water | 298.0 | 398.0 | 398.0 | 398.0 | 298.0 |
| Carbon Black | 2.0 | 2.0 | — | — | 2.0 |
| Ground Wood | 80.0 | 180.0 | — | — | — |
| Wood Flour | — | — | 114.0 | 108.0 | 40.0 |
| Glass Fiber (⅛") | — | — | 6.0 | 12.0 | — |

The procedure described in Example 2 is used to carry out each of the reactions of this example. The ground wood filler is much coarser than wood flour and is widely used as a filler in commercial particle board products. The viscosity of Reaction Mixtures A and B is much lower than mixtures with wood flour fillers of comparable solids content and enables the reaction mixture to be more readily agitated.

Particulate, readily filterable filler-containing resole products are obtained from each of the reaction mixtures of the Example. Each of the resin products of the Example are cured into uniformly colored plaques.

EXAMPLE 8

In this experiment a standard formula having the following proportion of ingredients is used:

| | | |
|---|---|---|
| Phenol | 100.0 gms. | |
| 50% Formaldehyde | 72.0 gms. | |
| Hexa | 9.0 gms. | |
| Vinol 205 | 2.0 gms. | |
| Water | 36.0 gms. | minimum more added as needed |
| Filler | 120.0 gms. | |

The reaction procedure of Example 2 is used in this Example. A number of filler materials are used in the reaction mixture, which is designed to yield a particulate-resole molding composition having a resin-filler ratio of about 50:50. The amount of water used in preparing each of the reaction mixtures is intended to afford a batch that can be effectively agitated during the reaction. The amount of water actually used varies depending on the type of filler, but each reaction batch requires at least about 30 percent by weight of water.

It is easy to differentiate the filler materials that may be suitable from those which are not, since the latter fillers form particulate products that wherein the resin and filler materials are separate and distinct components.

The following materials are found to be completely operative: long fiber asbestos (available from Johns-Manville as JM7-D24); large particle wood flour; wood flour; and talc.

In Table II is listed the materials which are found to be inoperative.

TABLE II

MATERIAL

Calcium silicate (Wollastonite F-1)—poor particulate product, variation in particle size and some separation of resin and filler.

Carbon Fiber (short)—reaction mixture coalesced after 35 minutes.

Hydrated Alumina (Alcoa C-331)—reaction mixture coalesced.

Glass Spheres (Cataphote Glass Beads P-93)—reacts and filters without difficulty but filter cake separates into two layers, glass and resin. Molded plaques not uniform.

Aluminum Oxide (Alundum 120 mesh grit)—particles separates into two phases.

Mixture of Glass Fiber (40 gms ⅛" and 80 gms. glass spheres)—agitation of reaction mixture very poor.

What is claimed is:

1. A process for producing particulate solid, heat-reactive, substantially water-insoluble resole molding compositions which process comprises the steps of:
   (a) reacting formaldehyde, a phenol, and an effective amount of an amine compound selected from the group consisting of hexamethylenetetramine, a compound containing amino hydrogen, and mixtures thereof, in an aqueous medium containing a substantially water-insoluble filler material having reactive sites on the surface thereof which chemically bond with a phenolic resin in an amount sufficient to provide a molding composition with at least about 5 weight percent of said filler and an effective amount of a protective colloid that exhibits protective colloid properties, for a period of time and at a temperature sufficient to produce an aqueous dispersion of a particulate solid, heat-reactive, substantially water-insoluble, thermosetting resole molding composition which has been advanced to the desired stage; and
   (b) recovering said resole from said aqueous dispersion.

2. The process of claim 1 wherein the amine compound is hexamethylenetetramine or ammonia.

3. The process of claim 1 wherein the phenol is monohydroxybenzene, 2,2-bis(4-hydroxyphenyl)propane, m-cresol, resorcinol, or mixtures thereof.

4. The process of claim 1 wherein the phenol is monohydroxybenzene, 2,2-bis(4-hydroxyphenyl)propane, or a mixture thereof.

5. The process of claim 2 wherein the phenol is monohydroxybenzene, 2,2-bis(4-hydroxyphenyl)propane, or a mixture thereof.

6. The process of claim 1 wherein the protective colloid is selected from the group consisting of gum arabic, gum ghatti, hydroxyalkyl guar gum, partially hydrolyzed polyvinyl alcohol, carboxymethyl cellulose and hydroxyethyl cellulose.

7. The process of claim 2 wherein the protective colloid is selected from the group consisting of gum arabic, gum ghatti, hydroxyalkyl guar gum, partially hydrolyzed polyvinyl alcohol, carboxymethyl cellulose and hydroxyethyl cellulose.

8. The process of claim 4 wherein the protective colloid is selected from the group consisting of gum arabic, gum ghatti, hydroxyalkyl guar gum, partially hydrolyzed polyvinyl alcohol, carboxymethyl cellulose, and hydroxyethyl cellulose.

9. The process of claim 5 wherein the protective colloid is selected from the group consisting of gum arabic, gum ghatti, hydroxyalkyl guar gum, partially hydrolyzed polyvinyl alcohol, carboxymethyl cellulose, and hydroxyethyl cellulose.

10. The process of claim 1 wherein step (a) is carried out at a temperature of at least 55° C. to a predetermined end point, whereupon the aqueous dispersion is rapidly cooled to a temperature below about 40° C.

11. The process of claim 2 wherein step (a) is carried out at a temperature of from at least 55° C. to a predetermined end point, whereupon the aqueous dispersion is rapidly cooled to a temperature below about 40° C.

12. The process of claim 4 wherein step (a) is carried out at a temperature of at least 55° C. to a predetermined end point, whereupon the aqueous dispersion is rapidly cooled to a temperature below about 40° C.

13. The process of claim 5 wherein step (a) is carried out at a temperature at least 55° C. to a predetermined end point, whereupon the aqueous dispersion is rapidly cooled to a temperature below about 40° C.

14. The process of claim 6 wherein step (a) is carried out at a temperature of at least 55° C. to a predetermined end point, whereupon the aqueous dispersion is rapidly cooled to a temperature below about 40° C.

15. The process of claim 7 wherein step (a) is carried out at a temperature of at least 55° C. to a predetermined end point, whereupon the aqueous dispersion is rapidly cooled to a temperature below about 40° C.

16. The process of claim 1 wherein step (a) is carried out at a temperature within the range of from about 70° to about 100° C. to a predetermined end point, whereupon the aqueous dispersion is rapidly cooled to a temperature below about 40° C.

17. The process of claim 9 wherein step (a) is carried out at a temperature within the range of from about 70° C. to about 100° C. to a predetermined end point, whereupon the aqueous dispersion is rapidly cooled to a temperature below about 40° C.

18. The process of claim 1 wherein the amount of said filler in said aqueous medium is sufficient to provide a resole molding composition with up to about 75 weight percent of filler.

19. The process of claim 1 wherein said filler material is selected from the group consisting of cellulose fibers, asbestos fiber, wood flour, talc and mixtures of the same.

20. The process of claim 9 wherein the amount of said filler in said aqueous medium is sufficient to provide a resole molding composition with up to about 75 weight percent of filler.

21. The process of claim 20 wherein said filler material is selected from the group consisting of cellulose fibers, asbestos fibers, wood flour, talc and mixtures of the same.

22. The process of claim 1 wherein at least about 3 parts of amine compound per 100 parts of phenol is used.

23. The process of claim 4 wherein at least about 3 parts of amine compound per 100 parts of phenol is used.

24. The process of claim 5 wherein at least about 3 parts of amine compound per 100 parts of phenol is used.

25. A sinter-resistant, particulate solid, heat-reactive, substantially water-insoluble resole, which consists essentially of the product of the process of claim 1.

26. The resole of claim 25, wherein said resole consists essentially of the product of the process of claim 2.

27. The resole of claim 25, wherein said resole consists essentially of the product of the process of claim 3.

28. The resole of claim 25, wherein said resole consists essentially of the product of the process of claim 4.

29. The resole of claim 25 wherein said resole consists essentially of the product of the process of claim 5.

30. The resole of claim 25, wherein said resole consists essentially of the product of the process of claim 6.

31. The resole of claim 25, wherein said resole consists essentially of the product of the process of claim 10.

32. The process of claim 1 wherein the phenol is a mixture of trifunctional or tetrafunctional phenol and less than about 50 mole % of a difunctional or monofunctional phenol.

33. The process of claim 32, wherein the trifunctional phenol is monohydroxybenzene and the difunctional phenol is p-t-butylphenol.

34. The process of claim 32, wherein the trifunctional phenol is monohydroxybenzene and the difunctional phenol is para-or ortho-cresol.

35. The process of claim 32, wherein the tetrafunctional phenol is 2,2-bis(4-hydroxyphenyl) propane.

36. The process of claim 1 wherein the aqueous dispersion contains about 30 to about 50% by weight of water.

* * * * *